Oct. 21, 1947.  A. AMSTUTZ  2,429,542
SELF-FEEDER FOR HOGS
Filed Jan. 30, 1945   4 Sheets-Sheet 1
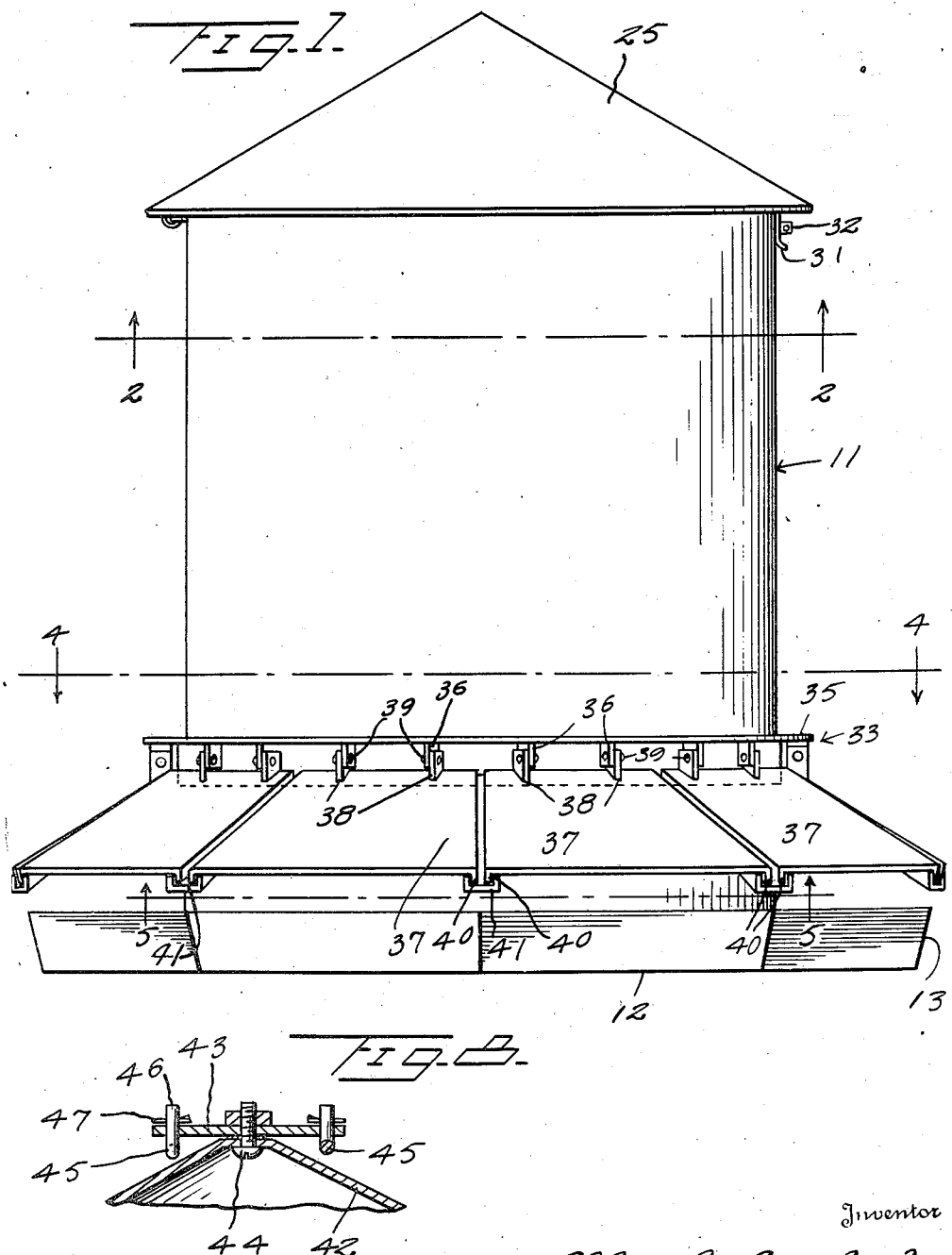
Inventor
Albert Amstutz
By Kimmel & Crowell
Attorneys

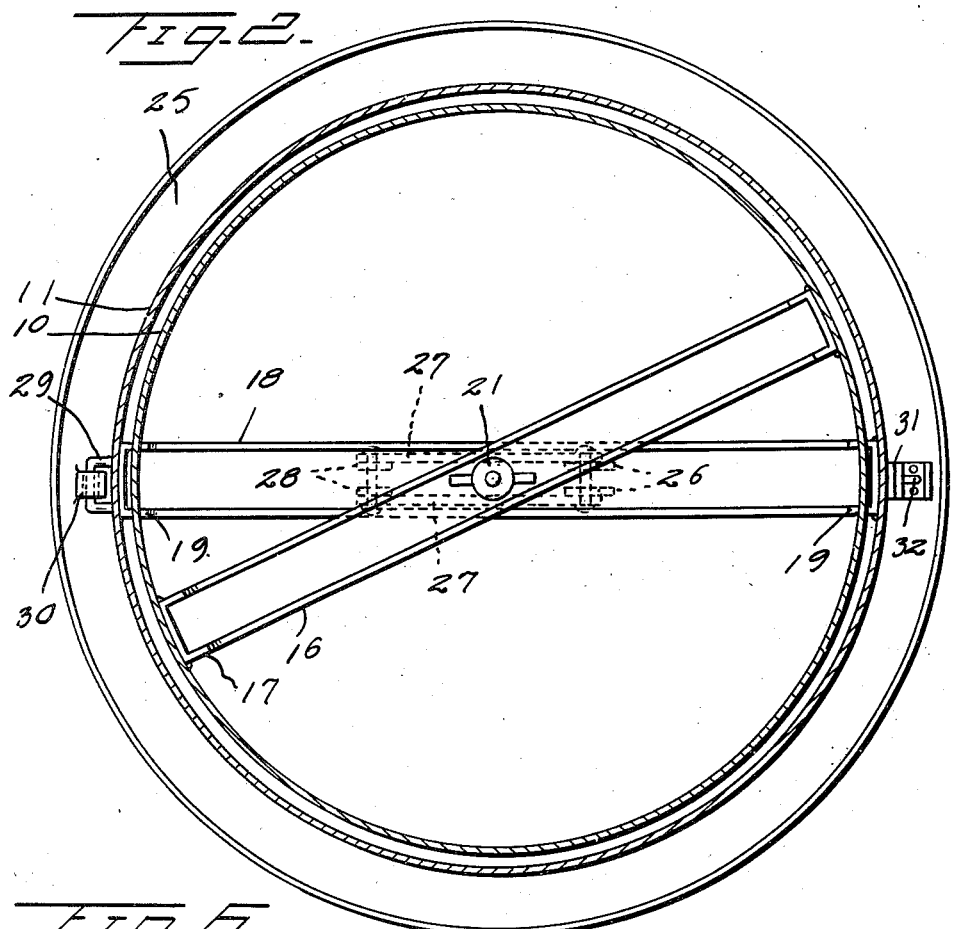
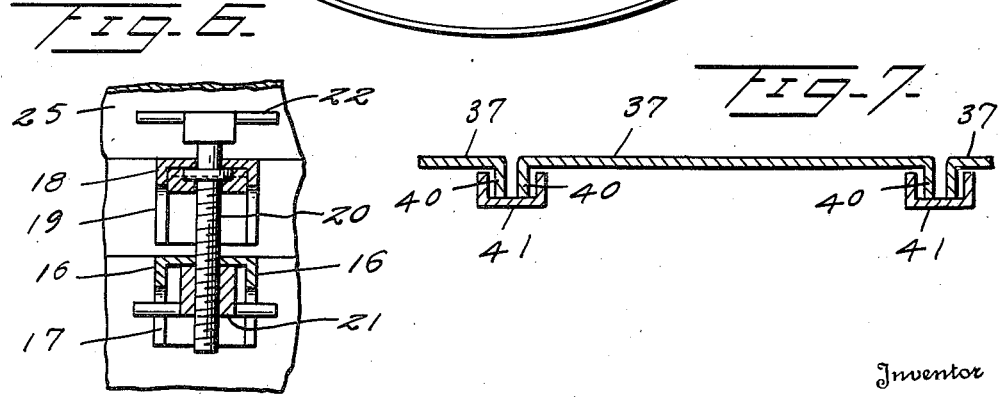
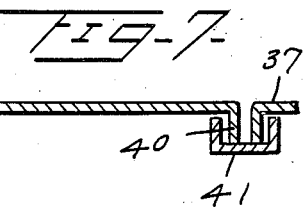

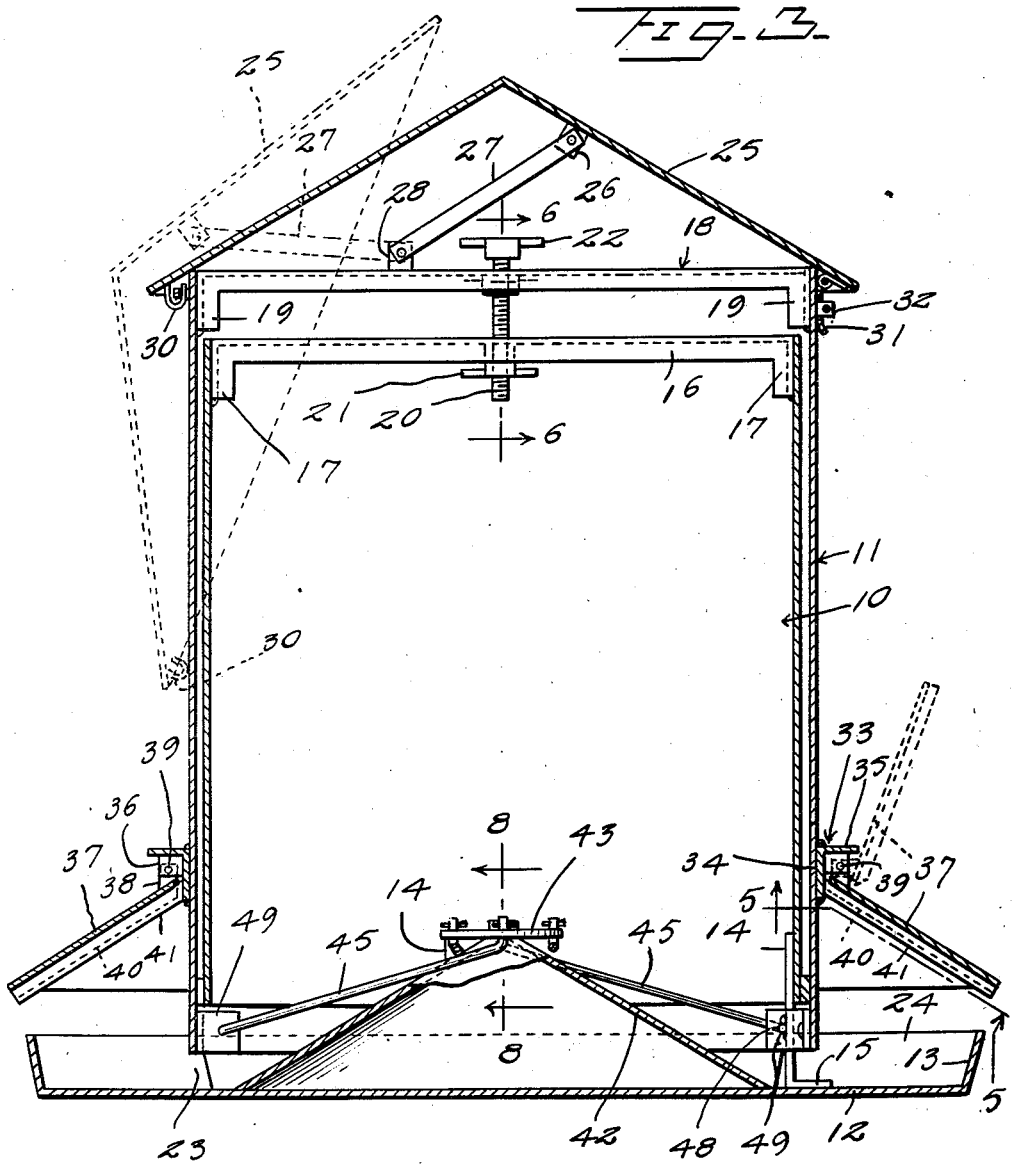

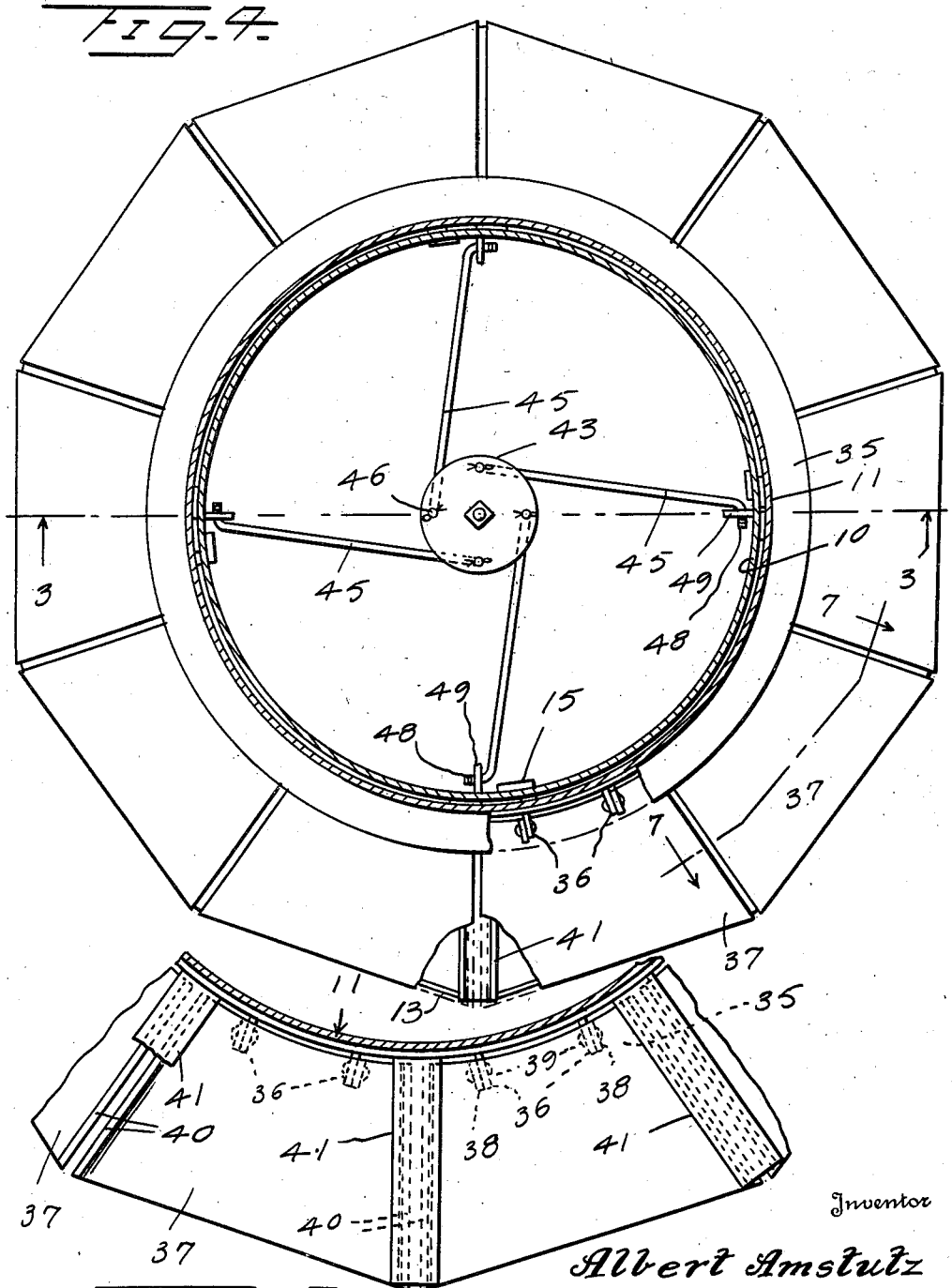

Patented Oct. 21, 1947

2,429,542

UNITED STATES PATENT OFFICE 2,429,542

SELF-FEEDER FOR HOGS

Albert Amstutz, La Rue, Ohio

Application January 30, 1945, Serial No. 575,251

4 Claims. (Cl. 119—53.5)

1

This invention relates to hog feeders and is an improvement over the feeder structure embodied in my prior patent for a Feeder, No. 2,165,121, issued July 4, 1939.

An object of this invention is to provide a self feeding structure for hogs which is so constructed that the feed will automatically move downwardly as it is removed from the feeding chambers, and the animals will be prevented from discharging the feed from adjacent chambers.

Another object of this invention is to provide in a device of this kind an improved means whereby the feed in the lower portion of the device may be agitated so as to break up any packed feed which may be in the lower portion of the device.

A further object of this invention is to provide a feeder of this kind which includes a plurality of closures over the feeding chambers so that the animals will be restricted to predetermined positions about the feeder.

A further object of this invention is to provide a device of this kind embodying an improved means for supporting the chamber closures.

With the foregoing objects and others which may hereinafter appear, the invention consists of the novel construction, combination and arrangement of parts as will be more specifically referred to and illustrated in the accompanying drawings, wherein are shown embodiments of the invention, but it is to be understood that changes, variations, and modifications may be resorted to which fall within the scope of the invention as claimed.

Figure 1 is a detailed side elevation of a feeder constructed according to an embodiment of this invention.

Figure 2 is a sectional view taken on the line 2—2 of Figure 1.

Figure 3 is a sectional view taken substantially on the line 3—3 of Figure 4.

Figure 4 is a sectional view taken on the line 4—4 of Figure 1.

Figure 5 is a fragmentary sectional view taken on the line 5—5 of Figure 1.

Figure 6 is a fragmentary sectional view taken on the line 6—6 of Figure 3.

Figure 7 is a fragmentary sectional view taken on the line 7—7 of Figure 4.

Figure 8 is a fragmentary sectional view taken on the line 8—8 of Figure 3.

Referring to the drawings:

The numerals 10 and 11 designate generally a pair of inner and outer cylindrical members which are disposed in slightly spaced relation relative to each other, the two cylindrical members being disposed in telescoping relation and the outer member 11 being substantially longer than the inner member 10. The inner member 10 is secured in upwardly spaced relation to a bottom tray or feeding trough 12 of polygonal configuration in plan, and which is formed at its outer margin with an upstanding flange 13. The inner cylinder 10 is supported about the base member or tray 12 by means of a plurality of upright bars 14 which are secured to the inner side of the cylinder 10 and are formed with right angular outwardly directed feet 15 secured by welding or other suitable fastening means to the upper surface or tray of the trough member 12. The inner cylinder 10 has firmly secured to the inner side thereof at the upper end a channel member 16 which is U-shaped in side elevation and has the outer legs 17 thereof secured as by welding or the like to the inner surface of the cylinder 10.

The outer cylinder 11 at the upper end thereof has secured to the inner side thereof a channel shaped member or bar 18 which is U-shaped in side elevation and has the legs 19 thereof welded or otherwise firmly secured to the inner side of cylinder 11.

Channel member 18 is positioned above channel member 16 and has swivelly mounted therethrough a cylinder adjusting shaft 20. The shaft 20 is threaded at its lower end through a nut 21 carried by the channel member 16 and the upper end of the shaft 20 is formed with handles 22 by means of which shaft 20 may be rotated to raise or lower cylinder 11 with respect to cylinder 10. The nut 21 is firmly secured to channel member 16 so that outer cylinder 11 may be readily adjusted to provide the desired space 23 between the lower end of cylinder 11 and the tray 12. The feed in inner cylinder 10 is adapted to pass through space 23 into the respective feeding chambers 24 which are formed outwardly of the outer cylinder 11 and inwardly of the flange 13. A conical top member 25 is swingably secured to or carried by the bar 18, the top member 25 having a pair of ears 26 on the inner side thereof between which a link 27 is pivotally mounted. The opposite or inner end of the link 27 is pivotally mounted between a pair of ears 28 which are secured in upstanding relation on the bar 18. The outer cylinder 11 is provided with a U-shaped keeper 29 adjacent the upper end thereof and the top member 25 has secured to the inner side thereof adjacent the outer margin, an upwardly directed hook 30 which is adapted to engage the keeper 29.

A diametrically disposed hasp 31 is carried by the top 25 and is adapted to engage a keeper 32 fixed to the cylinder 11 so that the top 25 may be locked in its cylinder covering position. When it is desired to adjust the space 23 to provide for greater or less feed entering the feeding chambers 24, the top 25 is swung laterally and downwardly to the dotted line position shown in Figure 3.

An annular angle member 33 is secured to the outer cylinder 11 at a point spaced upwardly from the lower end thereof having one side 34 thereof vertical and welded or otherwise secured to the cylinder 11. The other side 35 of the angle member 33 is uppermost and extends outwardly in a horizontal position. The angle member 33 has secured thereto a plurality of circumferentially spaced apart ears 36 which may be welded or otherwise secured to the inside of the angle formed by the sides 34 and 35. A plurality of truncated triangularly shaped closures 37 having pairs of upstanding ears 38 at their inner ends, are pivotally carried by the pairs of ears 36, being pivotally mounted on pivot members 39. The closures 37 are each provided at their opposite outwardly divergent edges with down-turned flanges 40 which provide a bracing means for the closures 37. The closures 37 are supported in closed position by means of downwardly and outwardly inclined channel members 41 which are secured at their inner ends to the angle member 33. The channel formed by the channel members 41 is of sufficient width so that the flanges of adjacent closures may engage a single channel member. The lower and outer ends of the channel members 41 are spaced upwardly from the upper edge of flange 13 so that the animal may project its snout beneath a closure 37 in order to raise the closure to open position. The closure 37 may be held in open position by any suitable means such as a frictional binding through the pivot members 39 and the ears 36 and 38.

The tray 12 has mounted in the center thereof a cone-shaped feed guiding member 42 which extends upwardly into the inner cylinder 10. The guiding member 42 has pivotally mounted on the apex thereof a plate 43, the latter being mounted on a pivot bolt 44 extending through the apex of the cone 42. A plurality of feed agitating rods 45 are secured at their inner ends to plate 43, being provided with upwardly directed inner ends 46 through which cotter pins 47 engage. The inner ends of the agitating rods 45 are loosely extended through the plate 43 so that the rods may partially rotate with respect to the plate 43. The outer ends of the rods 45 are formed with substantially right angular extensions 48 which loosely engage through inwardly extending ears 49 welded or otherwise firmly secured to the lower portion of the outer cylinder 11 at a point below the inner cylinder 10. The rods 45 extend from the apex of cone 42 at an acute angle with respect to the outer side of the cone so that the outer ends of the agitating rods 45 will be spaced upwardly from the base of the cone. The feed is agitated by either rotating or oscillating the outer cylinder 11 with respect to the inner cylinder 10.

In the use of this feeder, the feed is inserted in the inner cylinder 10, the lid or top 25 being swung laterally and downwardly to the dotted line position shown in Figure 3. The outer cylinder may be vertically adjusted through the adjusting shaft 20 to provide for discharge of feed from cylinder 10 through space 23 into the feeding chambers 24. After the cylinder 10 which constitutes a magazine, has been filled or substantially filled with feed, top 25 is swung inwardly to the full line position shown in Figure 3, and may then be firmly secured by the hasp 31. When the animal desires to obtain food from this device, the animal may raise a selected one of the closures 37 by projecting its snout or nose beneath a closure which extends a slight distance beyond the peripheral edge of flange 13. The space between the lower outer edges of the closures 37 is provided not only to permit the animals to raise the closures, but also so that animals may smell the feed and make it unnecessary for an attendant to open the closures. In the event the feed should not move downwardly over the guide 42 and through space 23 into the outer portion of the tray 12 by reason of packing within the lower portion of the magazine or inner cylinder 10, the outer cylinder may be partially rotated or oscillated, thereby causing the rods 45 to break up the packed feed and permit the feed to gravitatingly move outwardly through the space 23.

This device will provide an automatic feeding means for feeding hogs or other animals, and will make it unnecessary for an attendant to be present during the feeding operation. Furthermore, by means of the plurality of radially arranged closures, a number of animals may feed at one time undisturbed one by the other. The channel members 41 will constitute a guide which will prevent an animal feeding from one chamber from disturbing an adjacent animal feeding from an adjacent chamber.

What is claimed is:

1. A feeder comprising a lower feeding tray, a magazine extending upwardly from said tray, means supporting said magazine in upwardly spaced relation with respect to said tray to thereby provide a feed passage, a conical feed guiding member carried by said tray below said magazine, a feed regulating member loose about said magazine, means adjustably and rotatably supporting said regulating member, said latter means being supported by and engaging between said magazine and said regulating member, whereby the lower end thereof may constrict or enlarge said feed passage, and means connected to the interior of said regulating member adjacent the lower end thereof for agitating the feed.

2. A feeder as set forth in claim 1 wherein said latter means includes a plurality of inwardly extending rods connected at their outer ends to said regulating member.

3. A feeder as set forth in claim 1 wherein said means includes a plate rotatably carried by the apex of said conical guiding member, inwardly projecting lugs carried by said regulating member, and elongated rods connected between said plate and said lugs and overlying said guiding member whereby to agitate the feed engaging on said guiding member upon rotation of said regulating member.

4. A feeder comprising a lower feeding tray, a magazine extending upwardly from said tray, means supporting said magazine in upwardly spaced relation with respect to said tray to thereby provide a feed passage, a conical feed guiding member carried by said tray below said magazine, a feed regulating member loose about said magazine, means adjustably and rotatably supporting said regulating member whereby the lower end thereof may constrict or enlarge said feed passage, a plurality of outwardly extending closures carried intermediate the height of said regulating member and overlying the outer portions of said tray in spaced relation to said tray, a plurality of U-shaped closure supporting bars carried by said regulating member, a plate rotatably carried by the apex of said conical guiding member, inwardly projecting lugs carried by said regulating member, and elongated rods connected between said plate and said lugs and overlying said guiding member whereby to agitate the feed engaging on said guiding member upon rotation of said regulating member.

ALBERT AMSTUTZ.

REFERENCES CITED

The following references are of record in the file of this patent:

UNITED STATES PATENTS

| Number | Name | Date |
| --- | --- | --- |
| 1,520,607 | Smith | Dec. 23, 1924 |
| 1,815,679 | Ruth | July 21, 1931 |
| 2,226,476 | Maggart | Dec. 24, 1940 |
| 1,910,596 | Einsel et al. | May 23, 1933 |
| 1,750,025 | Rowe | Mar. 11, 1930 |
| 1,805,902 | Biel | May 19, 1931 |